Patented July 9, 1929.

1,720,051

UNITED STATES PATENT OFFICE.

ROBERT AMES NORTON, OF CRAFTON, PENNSYLVANIA, ASSIGNOR TO THE SELDEN COMPANY, OF PITTSBURGH, PENNSYLVANIA, A CORPORATION OF DELAWARE.

PLASTIC COMPOSITION.

No Drawing.   Application filed October 15, 1927.   Serial No. 226,522.

This invention relates to plastic compositions, to methods of producing the same, and more particularly to plastic compositions of aldehyde condensation products and similar resins which are capable of hardening by application of heat. The ester resins, such as glycerol, phthalate and the like, are excluded from the present invention.

Plastic compositions containing aldehyde condensation products possess many advantages, and are used for many purposes, their great strength, hardness and resistance to chemical action rendering them of great importance. Many if not most of these resins, however, possess the very serious disadvantage that they are brittle, and machine with difficulty.

According to the present invention, high boiling aliphatic esters are used as softeners or plasticizers. When incorporated with the resins in varying quantities the brittleness of the latter is to a great extent eliminated, and the products can be readily machined and are capable of taking on a high polish.

The high boiling aliphatic esters possess many advantages over some of the softeners which have been used hitherto, such as low boiling solvents, for example alcohols and acetones and such plasticizers as nitrobenzene and naphthalene. The high boiling aliphatic esters of the present invention are not sufficiently volatile to be driven off on subsequent heat treatment for hardening the resin, they do not give off poisonous vapors as does nitrobenzene and some similar plasticizers, and they avoid difficulties which are encountered when naphthalene is used, since they do not tend to produce crystalline structures.

Many of the esters are liquid, or are fusible at a very low temperature, so that they can be easily and homogeneously incorporated with aldehyde condensation products.

The amount of softener used depends of course on the character of the aldehyde condensation product which is to be softened and the character of the final product to be obtained. In general the softeners are usually added in amounts ranging from 5 to 30 per cent by weight of the aldehyde condensation products, but the invention in its broader aspects is not limited to this range. Aldehyde condensation products while in the fusible stage vary considerably in their physical properties, depending on the nature of the aldehydes and other components, such as phenols, and on the method of preparation which determines the extent of condensation or polymerization. Some of the products are liquids of greater or less viscosity, others are low melting solids, while still others melt at a relatively higher temperature. When a liquid ester is mixed with an aldehyde condensation product which is liquid at ordinary temperatures the incorporation may in some cases take place without the use of heat. Where, however, the condensation product or the ester is normally a solid it is desirable to apply sufficient heat to melt both components, in order to permit a homogeneous mixture. The heat employed should not be high enough and should not be maintained for a sufficient period to result in hardening or setting of the resin.

Many plastic compositions require the presence of comminuted fillers, such as wood flour and the like, and the plasticizers or softeners of the present invention may be incorporated into such compostions before, after or during incorporation of the filler or fillers. In general, it usually makes no difference when the high boiling ester is added, provided a homogeneous mixture is obtained. In many cases, however, it is desirable to add the plasticizer before incorporating fillers, particularly where the amount of the latter is very high. The best time to incorporate the ester in any particular composition will of course be apparent to the skilled resin chemist.

The range of aliphatic esters which can be used is a very large one and is limited solely by the boiling point of the ester and by its resistance to the temperatures which are encountered in the final setting or hardening of the resin. Esters of high boiling fatty acids, such as palmitic, stearic, oleic, lauric, myristic, linoleic, ricinoleic, and the like may be used. I have found, however, that the polybasic aliphatic acids are particularly useful for the production of plasticizing esters. The most important of such esters are those of maleic and fumaric acid, adipic acid, succinic acid, tartaric acid, and the like.

Most of the monohydric paraffine alcohols may be used in forming esters, such as for example ethyl, propyl, isopropyl, various isomeric butyl, amyl and hexyl alcohols and the like. Dihydric alcohols, such as glycol and homologues of glycol are also usuable. Glycerides tend to decompose and are not suitable. They are, therefore, excluded from the scope of the present invention.

Many fatty acid esters, both well known and newly discovered, are of importance, such as for example the palmitates of monohydric alcohols including such esters as propyl, isopropyl, normal and isobutyl, normal and isohexyl palmitates. Esters of stearic acid with monohydric alcohols such as the isomeric propyl, butyl, and amyl and hexyl stearates. Esters of oleic acid with monohydric alcohols such as isomeric propyl, butyl amyl, and hexyl esters. Many of these esters are new esters and in addition to the chemically pure esters certain mixed esters, such as for example esters of the above mentioned acids with mixed alcohols, as for example such as the mixture of isomeric amyl alcohols obtained from oil or natural gases are important for use in the present invention and for the most part constitute new products. In addition to the esters of the monohydric paraffine alcohols and the fatty acids certain alicyclic esters such as the esters of cyclohexanol are important. Glycol esters of the higher fatty acids may also be used.

In addition to the esters of the monobasic fatty acids with alifatic or alicyclic alcohols, certain esters of these acids with aralkyl alcohols, such as benzyl esters can be used.

I have found that the esters of the polybasic aliphatic acids and particularly of the diabasic aliphatic acids referred to above are especially efficient plasticizers. Among such are the known esters of maleic and fumaric esters such as dimethyl and diethyl esters and a number of new esters not heretofore described such as the isomeric dipropyl, diamyl, dihexyl esters as well as mixed esters, methylethyl, ethyl-propyl and the like are of importance and produce very desirable products when used with phenol aldehyde resins.

Similar esters of succinic and oxalic are also important, as are the esters of adipic acid, such as the methyl, ethyl, butyl esters and the mixed esters.

Glycol esters of the polybasic acids referred to above are also of importance as are the aralkyl esters, such as benzyl esters and the alicyclicesters as the cyclohexyl esters, methylcyclohexyl esters, etc.

For some purposes the various carbonic esters as methyl carbonate, ethyl carbonate and the like may be used but they are of lower boiling point and since many resins are hardened at high temperatures they are less satisfactory.

The invention will be described in greater detail in the following specific examples which are illustrations of the invention but do not limit its scope.

*Example 1.*

Phenol and formaldehye are combined by well known methods to form a condensation product which can be rendered infusible by heating. The condensation is preferably carried out in the absence of fixed alkalis, water is removed, and 10 to 20 per cent of butyl palmitate is homogeneously incorporated with the condensation product, heat being used if necessary to render the former sufficiently fluid to permit thorough mixture. The plasticized condensation product may if necessary be mixed with fillers, such as asbestos, wood flour and the like, and is then used for the production of suitable articles, being finally hardened by application of heat.

*Example 2.*

A fusible condensation product of phenol and furfural is prepared in the usual manner, and after removal of water and any free alkali which may be present, about 15 per cent of amyl stearate is thoroughly admixed, the condensation product being heated sufficiently to permit a thorough incorporation. Fillers may then be added if desired, and the composition hardened in the usual manner, for example, by hot molding.

*Example 3.*

A fluid condensation product of phenol and formaldehyde is prepared, and about 25 to 30 per cent of isopropyl palmitate is homogeneously incorporated. This product can be used as an enamel, if necessary with the addition of colors, and spreads well while hot on a clean metal surface. It should then be baked for a short time, if desired under pressure, to harden the resin. The enamel produced is superior to those prepared from unplasticized phenol and formaldehyde condensation products, and is much more flexible. Its spreading and covering powers are also improved.

*Example 4.*

A phenol formaldehyde condensation product is prepared as described in example one but instead of incorporating 10 to 20% of butyl palmitate 5 to 20% of cyclohexyl adipate is used. The plasticized condensation product may be mixed with suitable fillers if desired before hardening by heat. A product is obtained which can be readily machined and possesses desirable physical characteristics.

*Example 5.*

A phenol and formaldehyde condensation product is prepared in the usual manner and after removal of water and any free alkali which may be present 5 to 25% of diethyl maleate or fumarate is mixed in, the condensed product being heated sufficiently to permit a thorough incorporation. Fillers may be added if desired and the composition hardened in the usual manner.

*Example 6.*

A phenol and formaldehyde condensation product is prepared as described in Example 1 and 5–20% of a mixed maleic acid ester such as ethyl-isopropyl maleate is homogeneously incorporated, heat being used if necessary to render the phenol and formaldehyde condensation product sufficiently fluid to permit thorough mixture. The plasticized condensation product may then be hardened in the usual manner, without addition of fillers.

*Example 7.*

A phenol and formaldehyde condensation product is prepared as described in Example 1 and 10 to 20% of dibenzyl succinate is homogeneously incorporated using heat if necessary. The condensation product can then be hardened in the customary manner, fillers being added if desired.

*Example 8.*

A phenol furfural condensation product is prepared in the usual manner, and after removing water and any free alkali which may be present, 5 to 20% of cyclohexyl acetate is homogeneously incorporated, heat being used if necessary to permit a thorough incorporation. Fillers may be added if desired, and the composition hardened in the usual manner.

What is claimed as new is:

1. A plastic composition comprising a phenol aldehyde condensation product, initially fusible and capable of being hardened by heat, homogeneously admixed with a high boiling ester of a polybasic aliphatic acid and alcohols having less than three hydroxyl groups.

2. A plastic composition comprising a phenol aldehyde condensation product, initially fusible and capable of being hardened by heat, homogeneously admixed with a high boiling ester of a dibasic aliphatic acid and alcohols having less than three hydroxyl groups.

3. A plastic composition comprising a phenol aldehyde condensation product, initially fusible and capable of being hardened by heat, homogeneously admixed with a high boiling ester of an aliphatic acid and alicyclic alcohol.

4. A plastic composition comprising a phenol aldehyde condensation product, initially fusible and capable of being hardened by heat, homogeneously admixed with a high boiling ester of an aliphatic acid and arakyl alcohol.

5. A plastic composition comprising a phenol aldehyde condensation product, initially fusible and capable of being hardened by heat, homogeneously admixed with a high boiling ester of a polybasic aliphatic acid and at least two alcohols having less than three hydroxyl groups.

6. A plastic composition comprising a phenol aldehyde condensation product, initially fusible and capable of being hardened by heat, homogeneously admixed with a high boiling ester of a dibasic aliphatic acid and at least two alcohols having less than three hydroxyl groups.

7. A plastic composition comprising a phenol aldehyde condensation product, initially fusible and capable of being hardened by heat, homogeneously admixed with a diethyl ester of maleic or fumaric acid.

8. A plastic composition comprising a phenol furfural condensation product, initially fusible and capable of being hardened by heat, homogeneously admixed with a high boiling ester of an aliphatic acid with at least one alcohol containing less than three hydroxyl groups.

9. A plastic composition comprising a phenol furfural condensation product, initially fusible and capable of being hardened by heat, homogeneously admixed with a high boiling ester of a polybasic aliphatic acid with at least one alcohol containng less than three hydroxyl groups.

10. A plastic composition comprising a phenol formaldehyde condensation product, initially fusible and capable of being hardened by heat, homogeneously admixed with a high boiling ester of a polybasic aliphatic acid with at least one alcohol containing less than three hydroxyl groups.

11. A plastic composition comprising an aldehyde condensation product, initially fusible and capable of being hardened by heat, homogeneously admixed with an ester of a polybasic aliphatic acid and at least one alcohol having less than three hydroxyl groups.

12. A plastic composition comprising a phenol aldehyde condensation product, initially fusible and capable of being hardened by heat, homogeneously admixed with a high boiling ester of at least one acid falling under the group comprising maleic, fumaric, adipic, and succinic with alcohols having less than three hydroxyl groups.

Signed at Pittsburgh, Pennsylvania, this 14th day of October, 1927.

ROBERT AMES NORTON.